United States Patent

Simms

[15] 3,673,275
[45] June 27, 1972

[54] ACRYLIC POLYMERS CONTAINING EPOXY RADICALS

[72] Inventor: John A. Simms, Wilmington, Del.
[73] Assignee: E. I. du Pont de Nemours and Company, Wilmington, Del.
[22] Filed: March 5, 1970
[21] Appl. No.: 16,948

[52] U.S. Cl. ....................260/837 R, 260/37 EP, 260/836
[51] Int. Cl. ........................................................C08g 45/04
[58] Field of Search ..........................................260/836, 837

[56] References Cited

UNITED STATES PATENTS

| | | | |
|---|---|---|---|
| 3,465,058 | 9/1969 | McCarthy | 260/837 |
| 3,135,716 | 6/1964 | Uraneck | 260/836 |
| 3,208,980 | 9/1965 | Gruver | 260/836 |
| 3,529,034 | 9/1970 | Groff | 260/835 |
| 3,285,949 | 11/1966 | Siebert | 260/77.5 |
| 3,576,903 | 4/1971 | Groff | 260/835 |
| 3,580,830 | 5/1971 | Siebert | 260/836 |

*Primary Examiner*—Paul Lieberman
*Attorney*—John E. Griffiths

[57] ABSTRACT

A polymer containing epoxy radicals, useful for toughening epoxy resins, produced by admixing:
  A. at least one acrylic polymer selected from the group consisting of homopolymers and copolymers of monomers having the formula

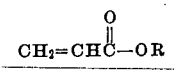

wherein R = alkyl of two through eight carbon atoms and copolymers formed from up to about 30 percent by weight, based on the total weight of the copolymer, of methyl methacrylate and monomers having the formula

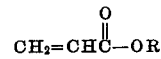

wherein R = alkyl of four through eight carbon atoms;
said acrylic polymer characterized by
  1. having an average of more than one radical per molecule, said radical selected from the group consisting of

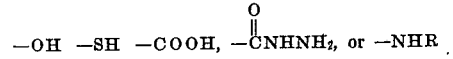

wherein R = H or lower alkyl and wherein at least one of the above radicals is located on a terminal position on the acrylic polymer molecule;
  2. having a number average molecular weight of above about 2,000;
  3. a glass transition point below about −25° C.;
  4. a solubility parameter between 8 and 10.5; and
B. at least one epoxy resin characterized by having an average of at least 1.8 epoxy radicals per molecule,
at a temperature and for a time sufficient to produce said polymer containing epoxy radicals.

10 Claims, No Drawings

ACRYLIC POLYMERS CONTAINING EPOXY RADICALS

BACKGROUND OF THE INVENTION

1. Field of the Invention

This invention relates to a polymer containing epoxy radicals that is useful for toughening epoxy resins.

2. Description of the Prior Art

As is known in the art, certain epoxy resin adhesive compositions possess high shear strength and bond quite well to many structural materials, i.e. metal, glass, wood, etc. However, a disadvantage of these epoxy resins is that they often do not possess a desirable degree of toughness, i.e. they have a tendency to be quite brittle and have low peel strength. Consequently, when the above-mentioned adhesives are used to fabricate structural materials, and are then subjected to mechanical stress, the adhesive may fail.

As well as this other cured epoxy resin compositions often exhibit a less than desirable degree of toughness.

SUMMARY OF THE INVENTION

According to the present invention, there is provided:

A polymer containing epoxy radicals produced by admixing:

A. at least one acrylic polymer selected from the group consisting of homopolymers and copolymers of monomers having the formula

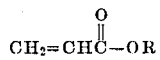

wherein R = alkyl of 2 through 8 carbon atoms and copolymers formed from up to about 30 percent by weight, based on the total weight of the copolymer, of methyl methacrylate and monomers having the formula

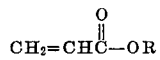

wherein R = alkyl of 4 through 8 carbon atoms;
said acrylic polymer characterized by 1. having an average of more than 1 radical per molecule, said radical selected from the group consisting of

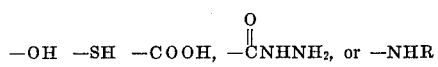

wherein R = H or lower alkyl i.e. $C_1$ through $C_6$ and wherein at least one of the above radicals is located on a terminal position on the acrylic polymer molecule;
2. having a number average molecular weight of above about 2,000;
3. a glass transition point below about $-25°$ C.;
4. a solubility parameter between about 8 about 10.5; and B. at least one epoxy resin characterized by having an average of at least 1.8 epoxy radicals per molecule, at a temperature and for a time sufficient to produce said polymer containing epoxy radicals.

It has been found that when a suitable amount of the above-described polymer is admixed with an epoxy resin and this mixture is cured with known curing agents, a cured epoxy adhesive composition is obtained that exhibits excellent toughness.

Also, as other uses for the above-described polymer there can be mentioned (1) its incorporation in an epoxy resin to produce an admixture that upon curing thereof is suitable for the encapsulation of electrical connections and the like (2) its incorporation in an epoxy resin that is reinforced with a material such as, for example, fiber glass and (3) its incorporation in coating compositions. Such incorporation of the polymers of this invention will result in a product that has excellent toughness.

DESCRIPTION OF THE INVENTION

Any suitable method can be used to produce the polymers of this invention. For example, a reaction can be used which consists of admixing at least one acrylic polymer and at least one epoxy resin, at a temperature and for a time sufficient to produce said polymer.

THE ACRYLIC POLYMERS

Among the acrylic polymers suitable for use in producing the compounds of this invention are the following:

homopolymers and copolymers of monomers having the formula

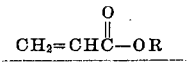

wherein R = alkyl of two through eight carbon atoms and copolymers formed from up to about 30 per cent by weight, based on the total weight of the copolymer, of methyl methacrylate and monomers having the formula

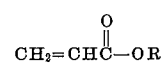

wherein R = alkyl of four through eight carbon atoms;
the above-mentioned acrylic polymers characterized by:

1. having an average of more than one radical per molecule, said radical selected from the group consisting of

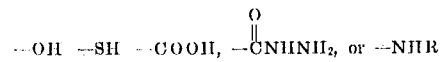

wherein R = H or lower alkyl i.e. $C_1$ through $C_6$ and wherein at least one of the above radicals is located on a terminal position on the acrylic polymer molecule;
2. having a number average molecular weight of above about 2,000;
3. a glass transition point below about $-25°$ C.; and
4. a solubility parameter between about 8 and 10.5.

The solubility parameter or $\delta$ is defined as $$\delta = \left(\frac{\Delta E}{V}\right)^{\frac{1}{2}}$$

wherein:
$\Delta E$ = the energy of vaporization to a gas at zero pressure;
$V$ = the molal volume of the liquid.

Methods of determining solubility parameters as used herein are known and are set forth, for example, in *Polymer Handbook*, ed. by J. Bandrup and E. H. Immergut. N. Y. Interscience Vol. 4, 1966, p. 341–346 wherein calculations for polymers are shown at page 344 of Section IV and Burrell, H. Solubility Parameters in Interchemical Review p. 3–16 Spring 1955 wherein calculations for polymers are shown on pages 10 and 11.

For the purpose of this invention, glass transition point is defined as the temperature region in which a polymer characteristically changes from a hard, more or less brittle glass to a rubbery or viscous polymer within which motions of portions of the chains, usually called segments, are comparatively unhampered by interactions between neighboring chains.

Of course, the above limits of the glass transition point and the solubility parameter will determine the upper limit of the number average molecular weight of the acrylic polymer. However, generally, the acrylic polymers will not have a number average molecular weight any greater than about 100,000 and under most circumstances, it will be no more than about 20,000. Preferably, the acrylic polymers will have a number average molecular weight of from about 2,000 to about 7,000.

Preferred acrylic polymers include those above-described having an average of 1.3 to 3 of the above-described radicals per molecule.

Other preferred acrylic polymers include those that are characterized by the above-mentioned items [1] through [4] but more specifically are formed from about 30 percent by weight, based on the entire weight of the polymer, of ethyl acrylate and about 70 percent by weight, based on the total weight of the polymer, of butyl acrylate and have an average of 1.3–3 radicals per molecule.

Especially preferred acrylic polymers include those that are characterized by the above-mentioned items [1] through [4], but more specifically are formed from about 30 percent by weight, based on the entire weight of the polymer, of ethyl acrylate and about 70 percent by weight, based on the entire weight of the polymer of butyl acrylate, have an average of about 1.75 —SH radicals per molecule and have a number average molecular weight of about 3,100.

The aforementioned acrylic polymers are commercially available or as is known by those skilled in the art, can be derived from the commercially available copolymers. For example, 1. acrylic polymers containing —SH radicals are commercially available;
2. acrylic polymers containing —COOH radicals can be produced by polymerizing monomers selected from the group consisting of methyl methacrylate and those having the formula

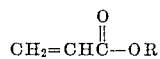

wherein R = alkyl of 2 through 8 carbon atoms with an azo initiator such as 4-azobis(4-cyanopentanoic acid);

3. acrylic polymers containing —NHR radicals, wherein R = H or lower alkyl, i.e. $C_1$ through $C_6$, can be obtained by reacting acrylic polymers containing —COOH radicals with an alkylene imine;
4. acrylic polymers containing

radicals can be prepared by reacting acrylic polymers containing —COOH radicals with methyl alcohol to produce the methyl ester thereof and then reacting this ester with hydrazine; and
5. acrylic polymers containing —OH radicals can be formed by reacting acrylic polymers containing —COOH radicals with ethylene oxide.

THE EPOXY RESINS

Suitable epoxy resins for use in this invention are those that are capable of being converted to a useful thermoset form. Generally, they will have an average of from about 1.8 to about 4 epoxy radicals per molecule and preferably from about 1.8 to about 3.5 epoxy radicals per molecule.

At the present time, it is believed that no useful purpose is served by using an epoxy resin having a number average molecular weight any greater than about 4,000. And under most circumstances, it will be no greater than about 2,000. Many preferred epoxy resins have a number average molecular weight below about 1,000 and many especially preferred epoxy resins have a number average molecular weight of from about 200 to about 800. At the present time, no useful purpose is seen in using an epoxy resin having a number average molecular weight any less than about 140.

The preferred epoxy resins for use in this invention are the complex epoxy-hydroxy polyethers which are obtained by the catalyzed condensation of polyhydric phenols or alcohols with an epoxy-contributing compound such as epihalohydrins and alkylene oxides as described in U.S. Pat. Nos. 2,456,408 and 2,592,560. Typical polyhydric phenols include the mononuclear phenols such as resorcinol, catachol and hydroquinone and the polynuclear phenols such as bis-(4-hydroxyphenyl) methane, 2,2-bis-(4-hydroxyphenyl)propane (also known as bisphenol A) and 2,2-bis-(4-hydroxy-2-methylphenyl)propane. Typical polyhydric alcohols include ethylene glycol, glycerine and trimethylol propane. Epichlorohydrin is the preferred epoxy-contributing compound.

Preferred epoxy resins suitable for use in this invention include those having the formulas:

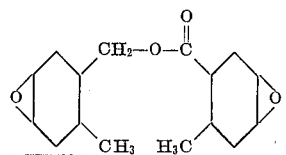

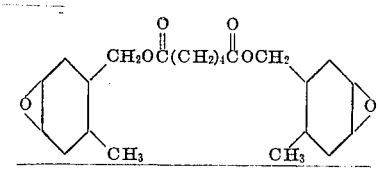

Particularly preferred epoxy resins are those obtained by the reaction of bisphenol A and epichlorohydrin (such reaction products hereinafter referred to as the diglycidyl ether of bisphenol A or DGEBA). The formula of DGEBA may be expressed as follows:

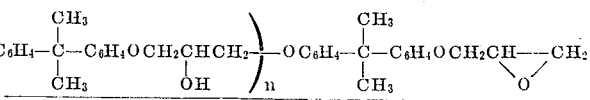

where $n$ has an average value from 0 to about 10. Generally, $n$ will be no greater than 2 or 3, and preferably has an average value of 0 through 1.

THE REACTION

The reactants, i.e. the above-mentioned acrylic polymers and epoxy resins, can be admixed in a reaction vessel in any order. Following the admixture of the reactants, stirring is continued and sufficient heat is applied to allow the reaction mixture to maintain a suitable temperature until the reaction has gone to completion. Of course, if desired, to minimize possible oxidation of the reactants, a nitrogen atmosphere may be maintained in the reaction vessel.

As an alternative reaction procedure, one can admix the reactants in a vessel and place it in an oven heated to a suitable reaction temperature. The vessel is then allowed ro remain in the oven until the reaction has gone to completion.

In determining a suitable reaction temperature, several factors should be considered. Generally, the optimum temperature will depend on the acrylic polymer used, the epoxy resin used, and the minimum period of time one desires for the reaction. Ordinarily the temperature will be in the range of about 120°–160° C., but may be higher or lower than this depending on the reactants and the time of reaction.

If desired, to determine more exactly when the reaction has gone to completion, one may employ an analysis technique that indicates when essentially all of the radicals

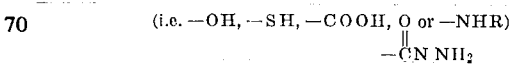

contained on the acrylic polymer have reacted with epoxy groups. For example, if acrylic polymers containing —SH radicals are admixed with DGEBA, when analysis reveals that —SH content in the reaction mixture is essentially zero, the reaction has gone to completion.

Concerning the ratio of epoxy resin to acrylic polymer, theoretically a ration of 2 equivalents epoxy to one equivalent polymer would be suitable. However, it has been found that it is desirable to use a ratio of greater than about 4 equivalents epoxy to one equivalent polymer, and preferably a ratio of 10–75:1.

Following the above described reaction, there will result an admixture of a polymer containing epoxy radicals (i.e. the acrylic polymer that has been reacted with the epoxy resin) in solution in the excess, unreacted epoxy resin. Generally, to produce a cured epoxy adhesive composition having excellent toughness, one should use 5–40 percent or preferably 10–25 percent by weight of the polymer containing epoxy radicals (these weight percentages being based on the combined weight of the polymer containing epoxy radicals and the unreacted epoxy resin). Thus, the resulting admixture following the reaction may have the proper weight ratio of polymer to epoxy resin; if it does not, the proper ratio may be obtained by adding more epoxy resin or polymer.

If desired, there may be incorporated in the above described admixture of a polymer containing epoxy radicals and epoxy resin, about 0.5 to 50 percent by weight of a suitable filler (said weight percentages based on combined weight of the polymer containing epoxy radicals, the unreacted epoxy resin, and the filler.). JAS Mar. 2, 1970. Suitable filler materials include finely divided (a) polymeric materials including the same or other epoxy resins in cured condition, (b) asbestos, (c) mica, (d) silica, (e) alumina, (f) aluminum, (g) calcium carbonate, etc.

The invention will be understood more clearly by reference to the following examples.

EXAMPLE 1

A round bottomed flask equipped with stirrer, thermometer, and $N_2$ inlet was charged with 75 grams (0.395 equivalent of epoxy) of DGEBA having an average value of about $n = 0.14$ ("Epon 826" available from Shell Chemical Company). To this was added 25 grams (0.0165 equivalent of —SH) of a mercaptan terminated ethyl acrylate/butyl acrylate copolymer, having an average of about 1.75 —SH radicals per molecule, a number average molecular weight of about 3,100, a glass transition point below about $-25°$ C., a solubility parameter between 8 and 10.5 and formed from about 30 weight percent ethyl acrylate and 70 weight percent butyl acrylate. The copolymer is designated "HYCAR MTA" (available from B. F. Goodrich Company).

Thus, the ratio of equivalents epoxide to equivalents —SH radical was about 24:1.

The above admixture was heated under nitrogen, with stirring, and maintained at about 150° C. for 3 hours.

After cooling, the above reaction mixture can be admixed with a suitable amount of ZZLA–0372 curing agent (available from Union Carbide Corporation and believed to be an admixture of phenol and aminoethylpiperazine), applied between substrates that are to be bonded (i.e. wood, metal, etc.), and allowed to cure at room temperature or elevated temperatures up to about 200° F. to produce a cured adhesive composition that has excellent toughness.

EXAMPLE 2

Example 1 can be repeated with the exception that an acrylic polymer characterized by
1. having an average of 1.3–3 —OH radicals per molecule;
2. having a number average molecular weight of above about 2,000;
3. having a glass transition point below about $-25°$ C.; and
4. having a solubility parameter between about 8 and 10.5, is used to produce a cured epoxy adhesive composition that has excellent toughness.

EXAMPLE 3

Example 1 can be repeated with the exception that an acrylic polymer characterized by 1. having an average of 1.3–3 —COOH radicals per molecule;
2. having a number average molecular weight of above about 2,000;
3. having a glass transition point below about $-25°$ C.; and
4. having a solubility parameter between about 8 and 10.5, is used to produce a cured epoxy adhesive composition that has excellent toughness.

EXAMPLE 4

Example 1 can be repeated with the exception that an acrylic polymer characterized by
1. having an average of 1.3–3

radicals per molecule;
2. having a number average molecular weight of above about 2,000;
3. having a glass transition point below about $-25°$ C.; and
4. having a solubility parameter between about 8 and 10.5, is used to produce a cured epoxy adhesive composition that has excellent toughness.

EXAMPLE 5

Example 1 can be repeated with the exception that an acrylic polymer characterized by
1. having an average of 1.3–3 —NHR radicals per molecule, wherein R is equal to H or lower alkyl, i.e. $C_1$—$C_6$;
2. having a number average molecular weight of above about 2,000;
3. having a glass transition point below about $-25°$ C.; and
4. having a solubility parameter between about 8 and 10.5, is used to produce a cured epoxy adhesive composition that has excellent toughness.

EXAMPLE 6

Examples 1–4 can be repeated with the exception that other epoxy-hydroxy polyethers which are obtained by the condensation of polyhydric phenols or alcohols with an epoxy contributing compound such as ephalohydrin and alkylene oxides are used.

The invention claimed is:
1. An acrylic polymer containing epoxy radicals produced by reacting reactants [A] and [B] in a reaction mixture consisting essentially of
A. at least one acrylic polymer selected from the group consisting of
homopolymers and copolymers of monomers having the formula

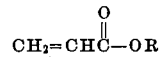

wherein R = alkyl of two through eight carbon atoms and copolymers formed from up to about 30 percent by weight, based on the total weight of the copolymer, of methyl methacrylate and monomers having the formula

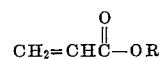

wherein R = alkyl of four through eight carbon atoms;
said acrylic polymer characterized by
1. having an average of more than one —SH radical per molecule and wherein at least one of the above radicals is located on a terminal position on the copolymer molecule;
2. having a number average molecular weight of above about 2,000;
3. a glass transition point below about $-25°$ C.;
4. a solubility parameter between about 8 and 10.5; and B. at least one epoxy resin characterized by having an average of at least 1.8 epoxy radicals per molecule, and present in an amount of at least 4 equivalents of epoxy resin to 1 equivalent of acrylic polymer, at a temperature and for a time sufficient to produce said acrylic polymer containing epoxy radicals.

2. The polymer of claim 1 wherein said acrylic polymer described in [A] has an average of 1.3–3 —SH radicals per molecule.

3. The polymer of claim 1 wherein said acrylic polymer described in [A] is characterized by being formed from about 30 percent by weight based on the entire weight of the polymer of ethyl acrylate and 70 percent by weight, based on the entire weight of the polymer of butyl acrylate having an average of about 1.75 —SH radicals per molecule, and having a number average molecular weight of about 3,100.

4. The polymer of claim 1 wherein said acrylic polymer described in [A] is characterized by being formed from about 30 percent by weight, based on the entire weight of the polymer, of ethyl acrylate, and 70 percent by weight, based on the entire weight of the polymer, of butyl acrylate, having an average of about 1.75 —SH radicals per molecule, having a number average molecular weight of about 3,100 and said epoxy resin described in [B] has the formula:

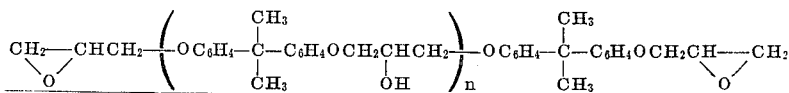

wherein n has an average value of 0 through 10.

5. In the method of producing a solid, infusible, cured epoxy resin composition which consists essentially of admixing A. an epoxy resin having an average of at least 1.8 epoxy radicals per molecule, and B. a sufficient amount of a suitable curing agent, at a temperature and for a time sufficient to produce said cured epoxy resin composition, the improvement which comprises admixing with the epoxy resin prior to its admixture with the curing agent, the polymer containing epoxy radicals defined in claim 1 in the amount of 5–40 percent by weight, based on the combined weight of the epoxy resin and the polymer containing epoxy radicals.

6. The product of claim 1 wherein said epoxide described in [B] is present in an amount to provide between 10–75 equivalents per equivalent of acrylic polymer.

7. The polymer of claim 1 wherein [A] and [ ] are reacted at a temperature of between about 120° C. and 160° C.

8. The polymer of claim 4 wherein [A] and [B] are reacted at a temperature of between about 120° C. and 160° C.

9. The process of claim 5 wherein there is also admixed a suitable filler.

10. The polymer of claim 1 wherein the reaction of [A] and [B] is carried essentially to completion.

* * * * *